Sept. 21, 1965          H. F. KANE          3,207,451
POWER FISHING REEL
Filed Dec. 17, 1962
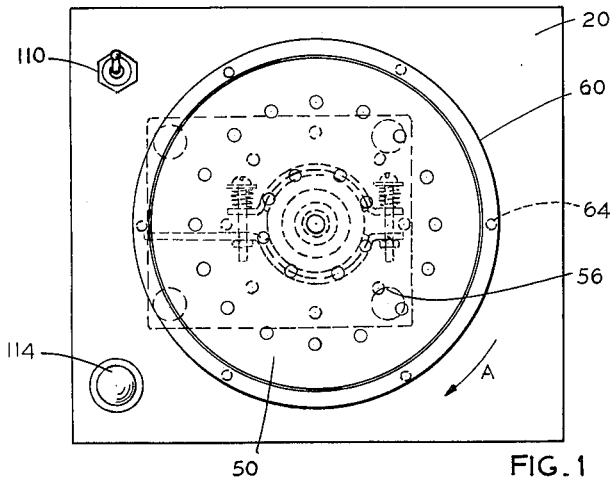
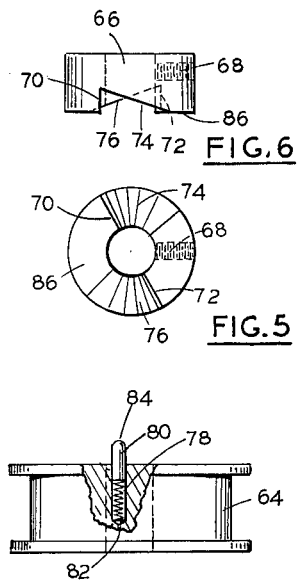
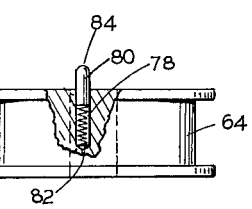
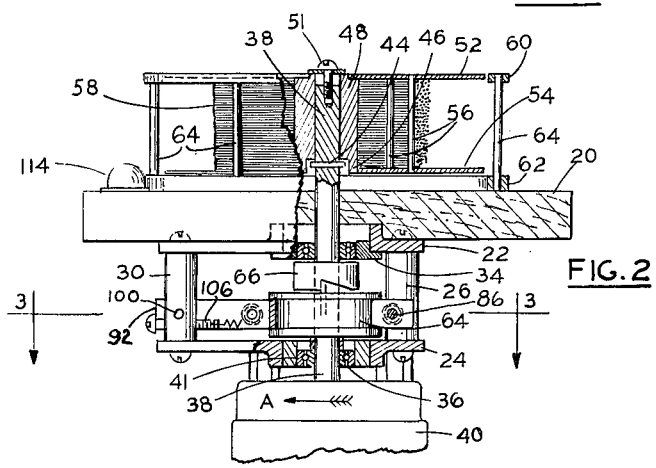
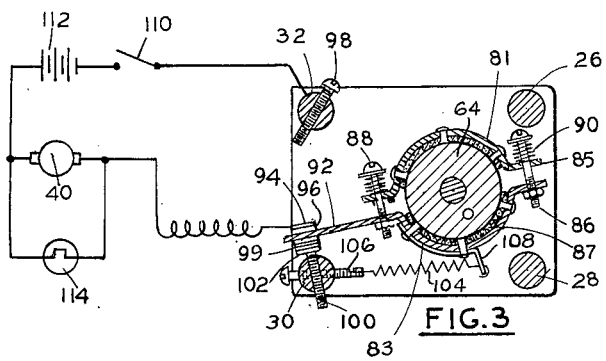
INVENTOR.
HUGH F KANE
BY
ATTORNEY

United States Patent Office 3,207,451
Patented Sept. 21, 1965

3,207,451
POWER FISHING REEL
Hugh F. Kane, R.D. 5, Lewis Road, Auburn, N.Y.
Filed Dec. 17, 1962, Ser. No. 245,217
6 Claims. (Cl. 242—54)

This invention relates to fishing reels, and more particularly to a power reel adapted for long line deep water trolling.

In trolling with a long line and at a considerable depth, it is usual practice for the angler to play the line, between the reel and its entry into the water so as to provide varying deceptive movements of the artificial bait as it is slowly drawn through the water by the movement of the fishing craft. Such playing of the line creates slack in the line between the hold of the fisherman and the reel, which may readily become ensnarled. Further as the line is brought in, particularly if accompanied by a catch requiring play, the grip on the line may require both hands. It is accordingly desirable to provide a reel which senses the presence of slack and which immediately takes up such slack, and which also will freely unreel as payout is desired with enough friction to prevent spinning.

The present invention is directed to a power reel, which is relatively free running for paying out line as desired, and which senses any slack and promptly reels in such slack. The invention is further directed to a fishing reel in which the reel is directly driven in one direction for reeling in the line by a small electric motor powered by a battery or other source of available power, and in which a slack sensing switch controls energization of the motor.

The invention is further directed to provision of friction drag in the reel during payout that is eliminated on reeling in.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings wherein like reference numbers indicate like parts;

FIGURE 1 is a plan view of the reel;
FIGURE 2 is a side elevational view with parts broken away;
FIGURE 3 is a transverse sectional view taken on the line 3—3 of FIGURE 2 showing the apparatus in position during line payout;
FIGURE 4 is an enlarged side elevational view of the friction drum, partly in section;
FIGURE 5 is a plan view of the jaw face of the clutch collar; and
FIGURE 6 is an enlarged side elevational view of the overrunning clutch collar.

Referring to FIGURES 1 and 2 there is shown a base 20, which may be the cover of a suitable housing or casing not shown for the mechanism below. Mounted on the under side of the base by any suitable means is a plate 22. A second or bottom plate 24 of similar shape is supported from plate 22 in spaced relation thereto by suitable corner posts 26, 28, 30 and 32. Each plate has an antifriction bearing 34 and 36 in which is journalled a shaft 38. The bearing 36 may be a thrust bearing, with its inner face affixed to the shaft. Secured, as by mounting screws 41 to the bottom plate 24, is a small electric motor 40, and the shaft 38 may be an extension of the shaft of the motor, or may be coupled to the motor shaft in any desired manner, such as to provide a positive drive, without necessity of exact alignment between the motor shaft and reel shaft.

The upper end of the shaft, above the base 20 is provided with a transverse drive pin 44 lying in a slot 46 in the underside of the hub 48 of the reel 50. The hub is held on the shaft against the pin by the screw 51. The reel comprises spaced side flanges 52 and 54, secured to the hub 48, and the side flanges are joined by a series of pins 56, disposed circumferentially around the reel at uniformly spaced intervals to provide an open drum, upon which the fish line 58 is wound. The reel flanges may be surrounded by stationary guard rings 60 and 62 connected by a plurality of cage forming pins 64, and the guard assembly is secured to the base 20 by any suitable means.

On the shaft 38, between the bearings 34 and 36 is a friction drum 64 freely rotatable on the shaft, and adjacent thereto is an overrunning clutch collar 66 of bronze or other suitable material and which is affixed to the shaft as by a set screw 68. The under face of the collar is provided with two diametrically opposed jaw clutch faces 70 and 72, having inclined surfaces 74 and 76 leading into the jaw faces 70 and 72. The upper face of the friction drum is provided with a blind aperture 78, in which is slidably disposed a clutch pin 80, that is backed up by a light compression spring 82. The rounded end 84 of the pin may be of wear resistant material and rides upon the lower face 86 of the clutch collar and the inclined faces 70 and 72 thereof, upon clockwise rotation of the collar 66 and shaft 38 relative to the drum. The spring pressed pin recedes yieldingly to permit relatively free rotation, in the reel wind up direction, which is the clockwise direction of rotation of the motor 40, as indicated by the arrow A in FIGURE 1, when the motor is energized.

Mounted on the drum 64, between the flanges thereof is a split band having arcuate friction shoes 81, 83 which are suitably lined with friction material 87. The shoes have ears 85 through which extend bolts 86 and 88 having adjustable compression springs 90, and by means of which the friction and pressure of the shoes on the drum may be nicely regulated. One of the shoes has an arm extension 92 carrying an electrical contact 94, insulated from the arm as at 96, which is adapted to engage a stationary contact 98 adjustably mounted on the post 32. The back side 99 of said contact is adapted to engage a threaded adjustable stop 100 in post 30, which has an abutment of insulation 102. The contact 98, and stop 100 provides limits for the angular movement of the arm 92.

A coil spring 104 extending between a screw hook 106 in the post 30 and a lug 108 mounted on the shoe 80, normally urges the friction band to rotate clockwise, so that the normal rest position of the arm 92 and is contact 94 is against contact screw 98. In practice the tension of the spring creates a torque on the friction band that is less than the friction slip torque between the drum and band.

The contacts 94 and 98 are connected in a circuit including a manual on and off switch 110, a battery 112, and the motor 40. A signal lamp 114 to indicate when the motor is running, may be connected in parallel with the motor 40.

From the foregoing description, it will appear that the fish line may be paid out as desired, the reel being free running except for such friction drag as is provided by the friction of the band upon the drum, which must rotate on payout, since the pin 80 will engage one or the other of the jaw faces 70 and 72. During such payout, the band arm 92 engages the stop 100 as shown in FIGURE 3. Any playing of the line may produce some slack. Initially such slack is taken up by the spring 104, as the band arm 92 swings or moves through the angular limit imposed by the stop 100 and contact 98. Thus a certain amount of give and take is had during which the slack is taken up by the spring 104 is thus provided. However any slack beyond that which may be taken up by the angular movement of the arm 92 between its stops, immediately energizes the motor which continues only so long as there is slack. The motor, in rereeling rotates the clutch in overrunning direction, thus eliminating the drag of the friction drum. Thus a minimum of power is consumed, and only then when the slack conditions call for motor operation. It will be seen that the fisherman may concentrate his attention on the line, without fear of entanglement of the line, since slack is at all times eliminated. At the same time he is aware by audio and visual signal means, that the motor is running since the light 114 is lighted, and the pin 80 renders a clicking sound as the collar 66 rotates relative to the drum 64.

The motor may be a light series wound motor, of a power sufficient to rotate the reel, and take up the slack, since in the absence of slack the circuit is opened. Thus the motor and reel do not serve as a power reel adapted to draw in line, but only acts to take up slack as the line is manually pulled in.

While a single form of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A power driven fishing reel comprising a support, a reel disposed above the support having a shaft journalled in the support, and a motor mounted below the support and having an armature connected to the shaft for direct drive, said motor being adapted to rotate the reel in reeling-in-direction, a friction drum freely mounted for rotation on said shaft, an arm having frictional contact with and carried by said drum and having limited angular movement in respect to said support on rotation of the drum in either direction, electrical contact means mounted on said arm and support for closing a circuit to said motor when said arm is swung to its limit in a rewind direction, means for resiliently biasing said arm to swing in a rewind direction to close said contacts and providing a torque less than the slip torque of said friction arm on said drum, and overrunning clutch means between said shaft and drum, whereby said drum is constrained to rotate with the shaft when rotating in a reel unwind direction, whereby to provide a frictional drag during unreeling and prevent free spinning of the reel in the unwind direction.

2. A power driven fishing reel comprising a support, a reel mounted above the support having a shaft extending through the support, a frame disposed below the support comprising spaced plates having bearings through which said shaft extends, and a motor having an armature directly connected to the shaft mounted below said frame, said motor being adapted to rotate the reel in reeling in direction, a friction drum freely mounted for rotation on said shaft between said plates, an arm having frictional contact with and carried by said drum, means for limiting angular movement of said arm, on rotation thereof with said drum in either direction, and contact means mounted on said arm and frame for closing a circuit to said motor when said arm is swung to its limit in a rewind direction, means for resiliently biasing said arm to swing in a rewind direction and providing a torque less than the slip torque of said friction arm on said drum, and overrunning clutch means between said shaft and drum, whereby said drum is constrained to rotate with the shaft when rotating in a reel unwind direction, whereby to provide a frictional drag during unreeling and prevent free spinning of the reel.

3. A power driven fishing reel comprising a support, a reel mounted above the support having a shaft extending through the support, a frame disposed below the support comprising spaced plates having bearings through which said shaft extends, and a motor having an armature directly connected to the shaft mounted below said frame, said motor being adapted to rotate the reel in reeling in direction, a friction drum freely mounted for rotation on said shaft between said plates, an arm having frictional contact with and carried by said drum, means for limiting angular movement of said arm, on rotation thereof with said drum in either direction, and contact means mounted on said arm and frame for closing a circuit to said motor when said arm is swung to its limit in a rewind direction, means for resiliently biasing said arm to swing in a rewind direction and providing a torque less than the slip torque of said friction arm on said drum, and overrunning clutch means between said shaft and drum comprising a collar affixed to the shaft having a one way jaw clutch face adjacent said drum, and a spring pressed pin disposed in said drum adapted to ride on said jaw clutch face, whereby said drum is constrained to rotate with the shaft when rotating in a reel unwind direction, to provide a frictional brake during unreeling, and prevent free spinning of the reel.

4. A power driven fishing reel in accordance with claim 1, having a signal means connected in parallel with the motor to indicate energization of said motor during rereeling.

5. A power driven fishing reel adapted to take up slack in a fishing line and comprising a reel, a motor having a drive connection to the reel for power rotation of the reel in reeling-in direction, friction means adapted to retard rotation of the reel in reeling out direction only, said means including a first member having an over running clutch connection with the reel, and a second member having limited angular movement, and frictionally coupled to the first member, means for biasing the second member to rotate in reeling-in direction, to one limit of its angular movement, when slack in the line permits free rotation of the reel in reeling-in direction, and means for energizing said motor for reeling in slack in response to rotation of said second member to the one limit of its biased angular movement.

6. A power driven fishing reel comprising a support, a reel disposed above the support having a shaft journalled in the support, and a motor mounted below the support and having an armature connected to the shaft, said motor being adapted to rotate the reel in reeling-in direction, an annular friction device freely mounted for rotation on said shaft, an arm having frictional contact with and carried by said device and having limited angular movement in respect to said support on rotation of the device in either direction, electrical contact means mounted on said arm and support for closing a circuit to said motor when said arm is swung in a rewind direction, means for resiliently biasing said arm to swing to its limit in a rewind direction to close said contacts and providing a torque less than the slip torque of said friction arm on said device, and over-running clutch means between said shaft and drum, whereby said device is constrained to rotate with the shaft when rotating in a reel unwind direction, whereby to provide a frictional drag during unreeling, and prevent free spinning of the reel in the unwind direction.

References Cited by the Examiner

UNITED STATES PATENTS

| | | | |
|---|---|---|---|
| 975,559 | 11/10 | Metcalf et al. | 254—172 |
| 1,482,924 | 2/24 | Hescock | 192—15 |
| 2,180,566 | 11/39 | Thompson | 242—84.51 |
| 2,352,309 | 6/44 | Benson | 254—172 |
| 2,727,724 | 12/55 | Biebighauser | 254—173 |
| 2,735,207 | 2/56 | Christiansen | 242—54 X |
| 3,003,453 | 10/61 | Jamieson | 242—54 X |

MERVIN STEIN, *Primary Examiner.*

RUSSELL C. MADER, *Examiner.*